United States Patent
Sidoti

(10) Patent No.: US 9,113,710 B2
(45) Date of Patent: Aug. 25, 2015

(54) EDGING SYSTEMS

(75) Inventor: Scott J. Sidoti, Madison, OH (US)

(73) Assignee: Scott J. Sidoti, Madison, OH (US)

( * ) Notice: Subject to any disclaimer, the term of this patent is extended or adjusted under 35 U.S.C. 154(b) by 0 days.

(21) Appl. No.: 14/123,835

(22) PCT Filed: Jun. 20, 2012

(86) PCT No.: PCT/US2012/043272
§ 371 (c)(1),
(2), (4) Date: Jan. 22, 2014

(87) PCT Pub. No.: WO2012/177711
PCT Pub. Date: Dec. 27, 2012

(65) Prior Publication Data
US 2014/0184037 A1    Jul. 3, 2014

Related U.S. Application Data

(60) Provisional application No. 61/638,051, filed on Apr. 25, 2012, provisional application No. 61/499,182, filed on Jun. 21, 2011.

(51) Int. Cl.
*E04C 2/38* (2006.01)
*A47B 96/20* (2006.01)
*A47B 13/08* (2006.01)
*E04F 15/14* (2006.01)
*F24J 2/52* (2006.01)
(Continued)

(52) U.S. Cl.
CPC .............. *A47B 96/201* (2013.01); *A47B 13/083* (2013.01); *A47B 2220/0077* (2013.01); *E04F 13/0871* (2013.01); *E04F 15/14* (2013.01); *E04F 19/0468* (2013.01); *E04F 19/061* (2013.01); *E04F 2019/0454* (2013.01); *F21V 33/0012* (2013.01); *F24J 2/526* (2013.01); *Y10T 29/49966* (2015.01); *Y10T 156/1089* (2015.01)

(58) Field of Classification Search
CPC ... F24J 2/526; E04F 19/061; E04F 15/02005; E04F 15/14; E04F 19/0463; E04F 19/0468; E04F 2019/0454; E04F 13/0871
USPC .......... 52/800.1, 802.1, 802.11, 716.1, 716.8, 52/717.01, 716.3, 716.4, 718.04, 287.1, 52/718.01
See application file for complete search history.

(56) References Cited

U.S. PATENT DOCUMENTS 2,646,325 A    7/1953    Abrahamson
3,899,859 A *  8/1975    Smith .......................... 52/288.1
(Continued)

OTHER PUBLICATIONS

International Search Report (ISR); PCT/US2012/43272; 6 Pages; Sep. 30, 2012.

*Primary Examiner* — Chi Q Nguyen
(74) *Attorney, Agent, or Firm* — Mark E. Bandy; Rankin, Hill & Clark LLP

(57) ABSTRACT

An easy to install countertop edging system comprising a profiled edge strip is described. The rear mating surface of the edge strip includes an adhesion promoting material for attachment to the substrate. An optional channel on the bottom of the edge strip allows for incorporation of lighting elements and decorative materials, mechanical securing of the edge and application of tools and additional features. The countertop edge system may also include a stanchion rail. The profiled edge strip is attached to an edge of a countertop or other substrate by the stanchion rail and/or structural adhesive. Related methods using the edge strip and rail are also described.

9 Claims, 17 Drawing Sheets

(51) Int. Cl.
   *E04F 19/06* (2006.01)
   *E04F 19/04* (2006.01)
   *E04F 13/08* (2006.01)
   *F21V 33/00* (2006.01)

(56) References Cited

U.S. PATENT DOCUMENTS

| | | |
|---|---|---|
| 4,996,817 A | 3/1991 | Nelson |
| 5,149,569 A * | 9/1992 | McCue ............................ 428/31 |
| 5,354,592 A | 10/1994 | Miskell |
| 5,470,140 A | 11/1995 | Schagunn |
| 6,183,585 B1 | 2/2001 | Kelley |
| 6,343,454 B1 | 2/2002 | Fisher |
| 6,972,367 B2 * | 12/2005 | Federspiel et al. ............ 174/481 |
| 7,430,978 B2 * | 10/2008 | Rezzonico ..................... 114/219 |
| 8,480,835 B2 * | 7/2013 | Pehr .............................. 156/228 |
| 8,567,333 B2 * | 10/2013 | Berman et al. ................. 114/219 |
| 2001/0037848 A1 | 11/2001 | Sciarrino et al. |
| 2002/0124525 A1 | 9/2002 | Stoffer |
| 2007/0166515 A1 | 7/2007 | Stupfel |
| 2007/0175147 A1 * | 8/2007 | Fiedler ........................... 52/466 |
| 2008/0295449 A1 | 12/2008 | Fisher |
| 2010/0018145 A1 * | 1/2010 | Ellis ............................... 52/312 |

* cited by examiner

EDGING SYSTEMS

CROSS REFERENCES TO RELATED APPLICATIONS

This application is a national stage application from International application Ser. No. PCT/US2012/043272, filed on Jun. 20, 2012, which claims priority from U.S. provisional application Ser. No. 61/638,051 filed on Apr. 25, 2012 and from U.S. provisional application Ser. No. 61/499,182 filed on Jun. 21, 2011.

FIELD

The present subject matter relates to edging systems, and more particularly, to a countertop edge that attaches to new or existing countertops or other substrates to thereby provide a profiled edge. The edging system is well suited for use with countertop overlay products.

BACKGROUND

Overlay systems are known in the art and produce a new surface on an existing countertop or other substrate. Countertop overlay systems have become very popular in recent years. Countertop overlay systems are significantly less costly as compared to removing an existing countertop and replacing with a new countertop. Furthermore, forming a new countertop surface by use of an overlay system is typically easier and less time consuming than removing an existing countertop; fashioning, i.e. sizing and cutting, a new countertop; and installing the new countertop. Moreover, many countertop overlay systems provide visually stunning and attractive aesthetics that traditional resurfacing systems cannot provide. Countertop overlay systems are also environmentally friendly and provide a "green" approach, since existing counters can be re-used and do not end up in a landfill.

However, a significant limitation of currently known overlay systems which consist mainly of special paint or stains, concrete, and epoxy; is that the overlay system conforms-to the design of the underlying substrate. Thus, if an overlay system is installed in association with an existing laminate or other type of counter, the finished product will have the same edge profile and layout as the original laminate or counter. This may, in some instances be undesirable. For example, the resulting product, i.e. the existing countertop coated with the overlay material, may appear as a relatively low cost laminate counter, instead of high end stone or granite counter.

Practices of modifying countertop edges are known. However, such practices are tedious, involve significant amounts of labor, and are relatively costly. A typical approach for modifying a countertop edge involves installing wood trim along the countertop edge. A person skilled in carpentry would be required to build a new edging substrate, router profiles into the edging substrate to thereby form the desired edge profile, then apply the overlay system on top of the edging substrate to form a new edge.

Currently, there are no known moldings that provide traditional countertop edge designs which can be used in association with overlay systems. This is believed to be due to the following. The features of a trim edge profile possessing tight curves and sharp features, would be washed out or distorted by a thick overlay. There are also difficulties with securing the trim to an existing counter. Moreover, differences in expansion and contraction stemming from the variety of materials result in defects particularly along the interface between the underlying original substrate, the trim, and/or the overlay material.

Accordingly, a need exists for a system and method by which a new edge profile or face can be provided along an edge of an existing substrate, and which is compatible with currently available overlay systems.

SUMMARY

The difficulties and drawbacks associated with previously known products and practices are overcome in the present edging systems and related methods.

In one aspect, the present subject matter provides an edging system comprising a stanchion rail defining an outer face and an oppositely directed inner face. The stanchion rail is adapted for affixment to a substrate such that the inner face of the stanchion rail contacts the substrate. The edging system also comprises a profiled edge strip defining an outer face, and a generally oppositely directed inner face. The inner face of the edge strip defines a receiving channel sized and shaped to fittingly engage the outer face of the stanchion rail. The stanchion rail is engaged within the receiving channel of the profiled edge strip by orienting the edge strip so that the receiving channel defined along the inner face of the edge strip faces the outer face of the stanchion rail and positioning at least one of the edge strip and the stanchion rail toward one another in a direction transverse to the longitudinal axis of the edge strip.

In another aspect, the present subject matter provides an edging system comprising a stanchion rail defining an outer face and an oppositely directed inner face. The stanchion rail is adapted for affixment to a substrate such that the inner face of the stanchion rail contacts the substrate. The edging system also comprises a profiled edge strip defining an outer face and a generally oppositely directed inner face. The inner face of the edge strip defines a receiving channel sized and shaped to fittingly engage the outer face of the stanchion rail; and at least one groove along the inner face. The profiled edge strip further defines an underside extending between the outer face and the inner face of the edge strip, the underside defining a recessed channel. The edging system additionally comprises a channel cap removably engaged to the profiled edge strip along the underside of the edge strip and extending across the recessed channel.

In yet another aspect, the present subject matter provides an edging system comprising a profiled edge strip defining an outer face, and a generally oppositely directed inner face. The inner face of the edge strip defines a plurality of grooves along the inner face. The profiled edge strip further defines an underside extending between the outer face and the inner face of the edge strip. The underside defines a recessed channel. The edging system also comprises a channel cap removably engaged to the profiled edge strip along the underside of the edge strip and extending across the recessed channel.

In still another aspect, the present subject matter provides a method of providing a profiled edge along a substrate. The method comprises providing a stanchion rail, and sizing the stanchion rail for a region of a substrate at which a profiled edge is to be located. The method also comprises applying a first adhesive to at least one of the stanchion rail and the region of the substrate at which the profiled edge is to be located. The method also comprises adhering the stanchion rail to the region of the substrate at which the profiled edge is to be located. The method additionally comprises providing a profiled edge strip defining a profiled outer face and an inner face defining a receiving channel sized and shaped to fittingly engage the stanchion rail. The method further comprises applying a second adhesive to at least one of the stanchion rail and the region of the substrate at which the profiled edge is to be located. And, the method also comprises engaging the profiled edge strip with the stanchion rail by positioning the stanchion rail at least partially within the receiving channel defined along the inner face of the edge strip, to thereby provide a profiled edge along the substrate.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Figure 1:
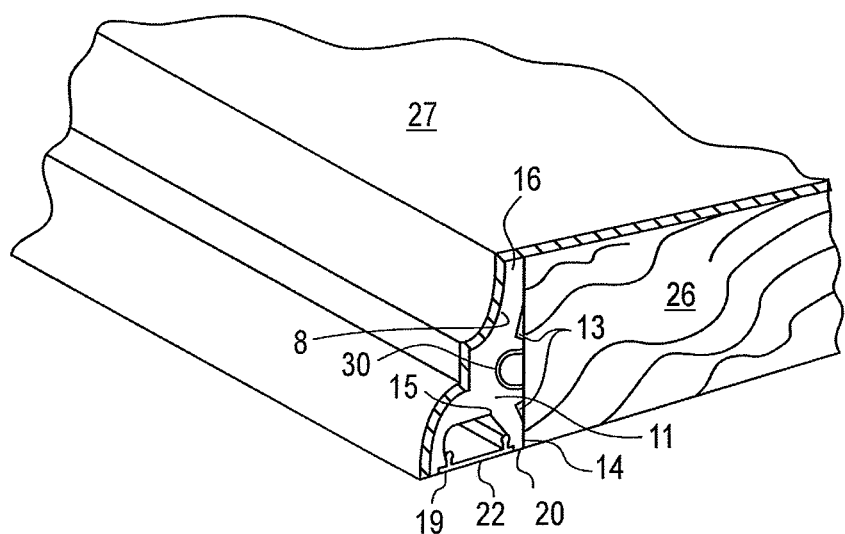
FIG. 1 is a perspective view of an installed edge system in accordance with the present subject matter.

The present subject matter provides an easy to install countertop edging system comprising an aesthetic profiled edge strip. In certain embodiments described herein, the edging systems also comprise a stanchion rail for use with the profiled edge strip. And, in additional embodiments described herein, the edging systems also comprise a channel cap used in conjunction with the profiled edge strip. In particular versions of the edging system, all of these components can be used together and in further combination with still other components. Preferably, all components are formed from an overlay compliant material described in greater detail herein. In certain versions, the profiled edge strip includes a rear mating surface formed from an adhesion promoting material to promote attachment of the edge strip to a substrate. In still other embodiments, the profiled edge strip includes a recessed groove for receiving and/or contacting the stanchion rail. In certain other embodiments, the stanchion rail is affixed to a substrate at a specific height to align the profiled edge strip with the top surface of the substrate or countertop. The stanchion rail serves as an alignment device in conjunction with providing a significantly stronger and more rigid connection to the substrate without the need to modify the substrate prior to attachment of the edging system components. Additionally, the stanchion rail can be offset to provide a wide array of different profile shapes, sizes, and configurations. An optional channel on the underside of the profiled edge strip enables mechanical securing of the edge strip in addition to or in lieu of using the stanchion rail system. These and other aspects are described in greater detail herein.

The present subject matter provides numerous advantages. A significant advantage is that the edging system can provide multiple edge profiles to either an existing substrate or to a new, uninstalled substrate. In addition, the edging system can be installed without special tools or skills. Furthermore, the edging system provides a platform that allows a variety of tools to be attached to a substrate for more efficient construction and finishing. Moreover, the edging system provides an economical and green solution for providing custom edges for substrates and with overlay systems. The edge profiles can also be combined to create new edge profiles and configurations and thicker cross-sections. Still further advantages will become apparent from the following description and drawings.

Before describing the various components, versions, and embodiments of the present subject matter, it will be appreciated that the same or similar reference numbers are used in the various figures to denote similar components, regions, or aspects. Thus, although the same reference number may be used in multiple figures illustrating different embodiments of the present subject matter, it will be appreciated that the same reference numeral is not to be construed as limiting the present subject matter. Furthermore, although the various edging systems are described herein with regard to countertops such as kitchen countertops, it will be appreciated that the edging systems have wide application and can be used in numerous other uses.

FIG. 1 is a perspective view of an installed edging system in accordance with the present subject matter. The edging system comprises a profiled edge strip 11 and a stanchion rail 30 disposed along a region such as an edge of a substrate 26. An overlay material 27 resides on top of the substrate 26, a top edge 16 of the edge strip 11, and an outer face 8 of the edge strip 11. A rear mating surface or inner face 14 of the profiled edge strip 11 defines one or more rear grooves 13. The inner face 14 of the edge strip 11 is adjacent to and preferably in contact with the substrate 26. The outer face 8 of the edge strip is generally oppositely directed from the orientation of the inner face 14 of the edge strip 11. It will be appreciated that the outer face 8 of the edge strip is sized, shaped, and configured to provide a desired edge configuration for the substrate 26. A rearward bottom edge 20 of the profiled edge strip 11 is aligned vertically with the base of the substrate 26. A channel 15 defined on the bottom or underside of the profiled edge strip 11 preferably receives, retains, and is covered with a channel cap 22. A forward bottom edge 19 of the profiled edge strip 11 completes the underneath portion of the edge strip 11. The profiled edge strip can be made from a variety of materials including but not limited to wood, plastic, composite materials or other suitable materials. In certain versions, the edge strip can be any solid color, or clear/translucent and made of one or more plastics such as acrylic, or another suitable material. In certain versions, the edge strip is light transmissive such that the edge strip is formed from material (s) and has a thickness that allows the passage of light. Examples of light transmissive materials are those that are transparent, optically clear, or translucent. The stanchion rail 30 is affixed, such as by adhering or by mechanically fastening to the substrate 26 and provides a means of securing and aligning the profiled edge strip 11.

Figure 2:
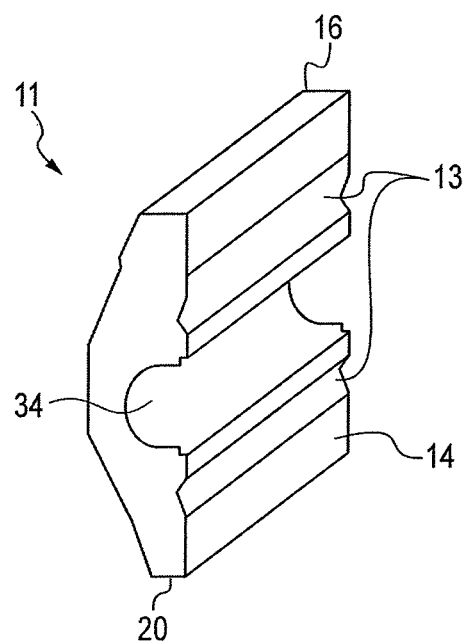
FIG. 2 is a rear perspective view of a profiled edge strip in accordance with the present subject matter.

FIG. 2 is a rear partial perspective view of a profiled edge strip 11. The version of the edge strip 11 shown in FIG. 2 does not include a channel or channel cap along an underside of the strip 11. As previously noted, the rear mating surface or inner face 14 extends between a top edge 16 and a bottom edge 20. In certain embodiments, the rear mating surface or inner face 14 includes an adhesion promoting textured surface. The rear surface 14 of the edge strip 11 may also define one or more rear grooves 13 to reduce material weight, along with reducing warpage or dimensional distortion of the component, i.e. the edge strip 11. The rear grooves 13 also provide an increased surface area for adhesive and ridges, i.e. sidewalls of the grooves to prevent vertical displacement after the edge strip 11 is adhesively applied. A stanchion groove 34 located in the rear of the profiled edge strip 11 is sized, shaped, and configured in a manner such that the stanchion rail can be firmly retained yet still be removable prior to structural adhesive application and final installation. This allows for dry fitting of the profiled edge strip prior to final installation. This preferred engagement between the edge strip and the stanchion rail is referred to herein as "fittingly engaged."

Figure 3:
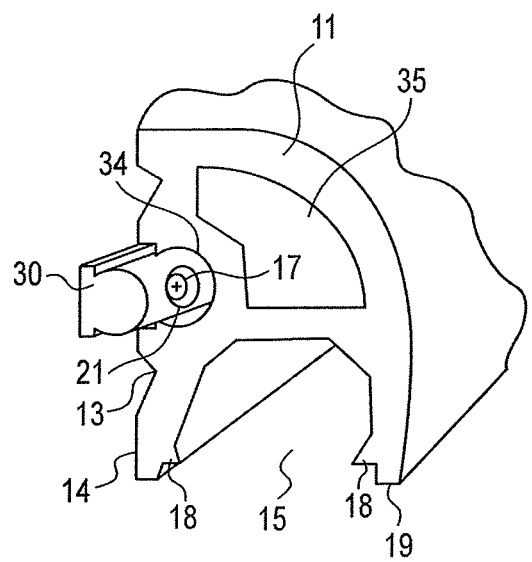
FIG. 3 is an end view of another profiled edge strip with a stanchion rail in accordance with the present subject matter.

FIG. 3 is an end view showing mating between a stanchion rail 30 and a profiled edge strip 11. A screw hole 21 is defined in the stanchion rail 30 with a threaded fastener such as a securing screw 17 installed therethrough. The stanchion rail 30 is mated with a stanchion groove 34 defined on the inner face 14 of the edge strip 11. In certain embodiments, the profiled edge strip 11 may define one or more interior hollow regions, for example hollow 35. The hollow 35 allows for reduced weight of the edge strip 11 while maintaining structural integrity. The channel 15 contains channel cap retainers 18 preferably on both sides of the channel. The rear grooves 13 along the inner face 14 provide a void that structural adhesive will fill when applied to the rear mating surface 14 of the edge strip 11. The channel cap retainers 18 are located along opposing interior walls of the channel 15 and preferably proximate the bottom edges of the edge strip 11.

In many embodiments of the present subject matter edging system, the profiled edge strip is engaged and/or contacted with a stanchion rail which in turn is engaged or affixed to a substrate of interest such as a countertop edge. Preferably, the engagement between the profiled edge strip and the stanchion rail is achieved by providing a receiving channel along an inner face of the edge strip which is sized and shaped to fittingly engage the outer face of the stanchion rail. In many versions, the receiving channel is configured so that the stanchion rail can be positioned within and contacted with the receiving channel by directly pressing the edge strip onto an installed stanchion rail. Thus, the stanchion rail is positioned within the receiving channel by orienting the edge strip so that the receiving channel of the edge strip faces the outer face of the stanchion rail, and then moving the edge strip in a direction transverse to the longitudinal axis of the strip, toward the rail. Restated, the entire length or at least portions of the length of the stanchion rail can be concurrently contacted with and positioned within corresponding regions of the receiving channel of the edge strip. This configuration is preferred over a "keyed" arrangement in which an end portion of an edge strip is engaged with an installed stanchion rail and then slid lengthwise along the rail to further engage regions of the edge strip to the rail. This latter "keyed" arrangement is difficult to employ particularly after adhesive has been applied along the interfacing surfaces of the rail, edge strip, and substrate.

Figure 4:
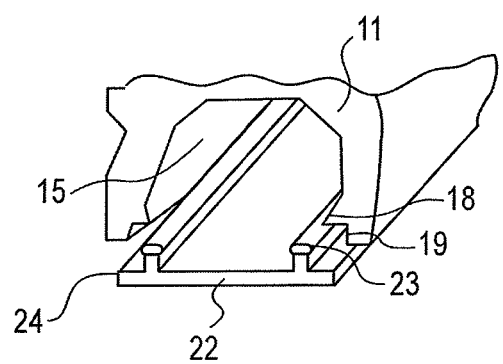
FIG. 4 is a partially exploded end view of a profiled edge strip and a channel cap in accordance with the present subject matter.

FIG. 4 is an exploded end view of a profiled edge strip 11 showing the installation of a channel cap 22. Channel cap retainers 18 are located on both inside surfaces of the channel 15 to receive the channel cap 22. One or more channel cap ears 23 extending from the channel cap 22 have a protruding feature that is secured by the channel cap retainers 18. A channel cap mating surface 24 will align with the underside of the channel cap retainers 18 and align flush with the forward bottom edge 19 upon installation and attachment of the channel cap 22 to a profiled edge strip 11.

Figure 5:
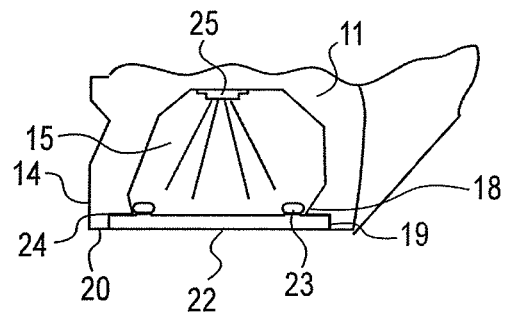
FIG. 5 is an end view of a profiled edge strip having a transparent or translucent channel cap along with optional lighting provisions in accordance with the present subject matter.

FIG. 5 is an end view of a profiled edge strip 11 with a channel cap 22 engaged therewith along with an optional lighting provision 25. The bottom surface of the channel cap 22 preferably aligns flush with the rearward bottom edge 20 and the forward bottom edge 19 of the strip 11 when secured via the channel cap retainers 18 in the channel 15. The channel cap 22 can be any solid color, or clear/translucent and made of one or more plastics, such as acrylic, or another suitable material. In certain versions, the channel cap is light transmissive such that the cap is formed from materials(s) and has a thickness that allow the passage of light. Examples of light transmissive materials are those that are transparent, optically clear, or translucent. When clear or translucent material is used for the channel cap 22, a low voltage lighting device 25 can be installed in the channel 15. The low voltage lighting device 25 depicted in FIG. 5 is in the form of Light Emitting Diodes (LEDs), but any low voltage lighting device 25 or light distributing component can be used.

Figure 6:
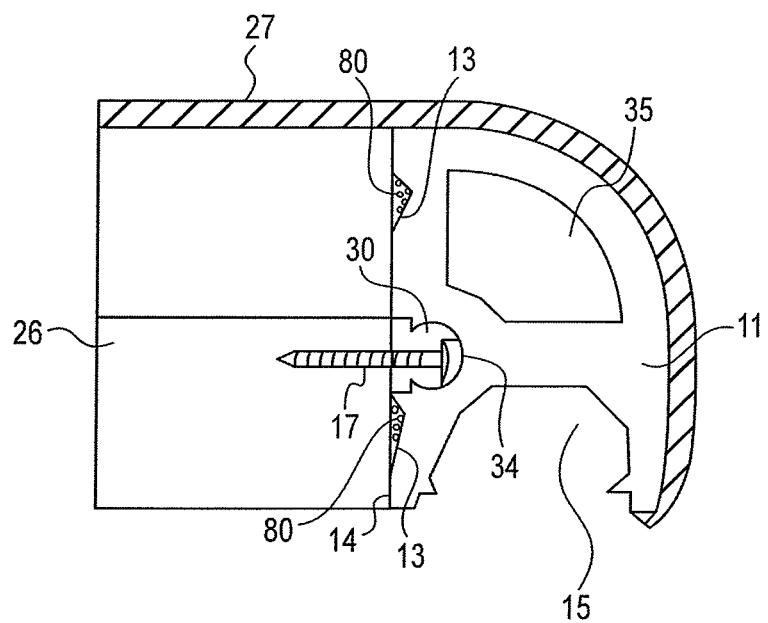
FIG. 6 is a cross sectional end view of a profiled edge strip attached to a custom built countertop substrate in accordance with the present subject matter.

FIG. 6 is a detailed view of an end region of a profiled edge 11 attached to a custom built countertop substrate 26. An adhesive layer 80 is disposed between the rear mating surface 14 of the edge strip 11 and the substrate 26, whereby the rear grooves 13 may contain relatively large amounts of adhesive 80 to prevent vertical shift of the edge strip 11 during adhesive cure and once the adhesive is cured. A securing screw 17 is installed in the stanchion rail 30 to mechanically fasten the rail to the substrate 26. The profiled edge strip 11 is secured to the stanchion rail 30. A variety of securing techniques and provisions may be used. In certain embodiments, the edge strip 11 having a receiving channel or stanchion groove 34 along the inner or rear face 14 of the edge strip 11 is engaged and contacted with the outer face of the stanchion rail 30. It may be preferred to use a structural adhesive between the two components and particularly along the interface between the edge strip and the stanchion rail. For example, the profiled edge strip 11 can be secured via structural adhesive disposed in the interface between the stanchion receiving groove 34 and the stanchion rail 30 filling any voids. The hollow 35 defined in the interior of the edge strip 11 maintains the aesthetic look of the finished substrate edge while greatly reducing weight and costs. An overlay system 27 is installed on top of the substrate 26 and generally along the outer face of the edge strip 11 to provide a finished countertop.

Figure 7:
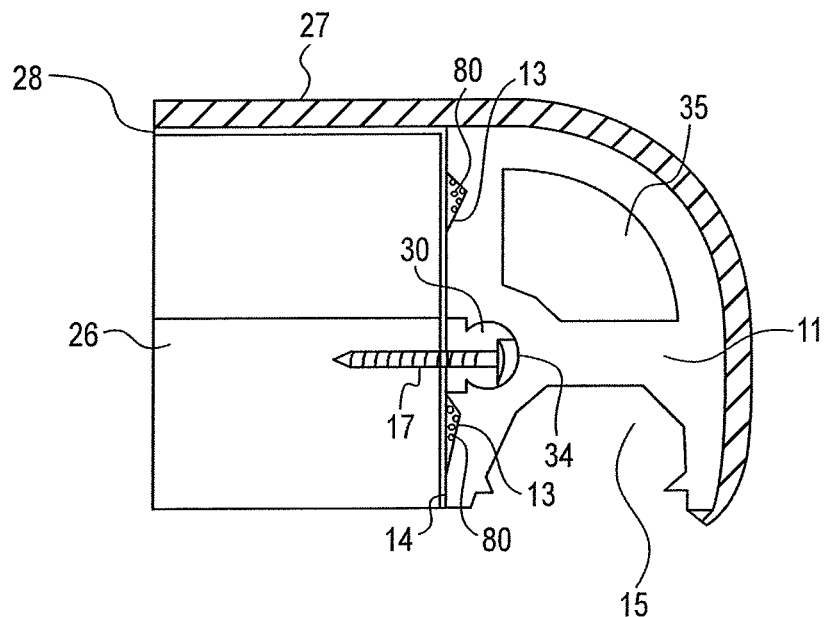
FIG. 7 is a cross sectional end view of a profiled edge strip attached to an existing laminate countertop substrate in accordance with the present subject matter.

FIG. 7 is an end view of an edge installation on a countertop or substrate 26 with an existing overlay system 28. One or more adhesive layers 80 are formed between the rear mating surface 14 of the edge strip 11 and the existing overlay system 28. The rear grooves 13 may contain relatively large amounts of adhesive 80 to prevent vertical shift once the adhesive is cured. A securing screw 17 is installed in the stanchion rail 30 to mechanically fasten the rail to the existing overlay system 28 and the substrate 26. This ensures a proper bond that is not dependent on the adhesive compatibility properties of the existing overlay system 28. The profiled edge strip 11 is secured via structural adhesive (not shown) in the stanchion receiving groove 34 filling any voids. An overlay system 27 is installed on top of the existing overlay system 28 and edge strip 11 to provide a new finished countertop edge.

Figure 8:
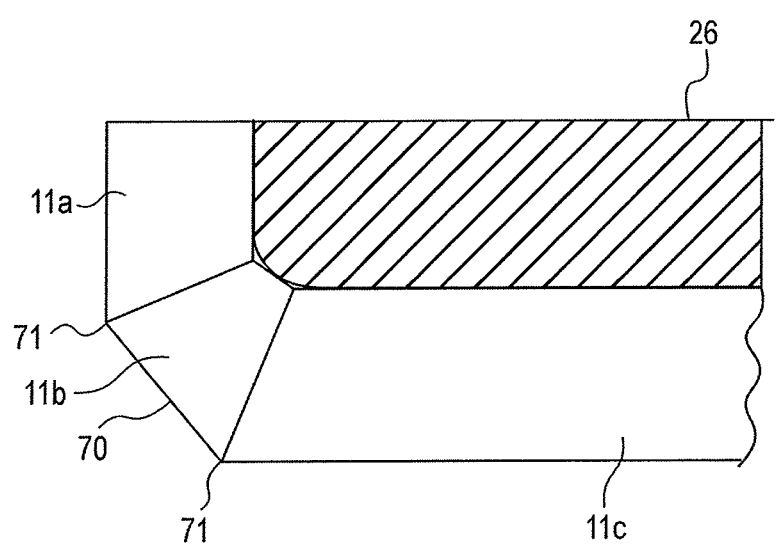
FIG. 8 is a top view of a laminate countertop having a rounded outer corner and mitred profiled edge strip components attached thereto in accordance with the present subject matter.

FIG. 8 is a top view of a countertop outside corner formed from an edging system in accordance with the present subject matter. An outside corner 70 is attained along substrate 26 for example by cutting a 22.5 degree angle 71 on each edge strip 11a and 11c in opposing directions, then cutting a 22.5 degree angle on both sides of a small edge strip 11b positioned therebetween. The pieces are then attached to the substrate 26 as described herein.

Figure 9:
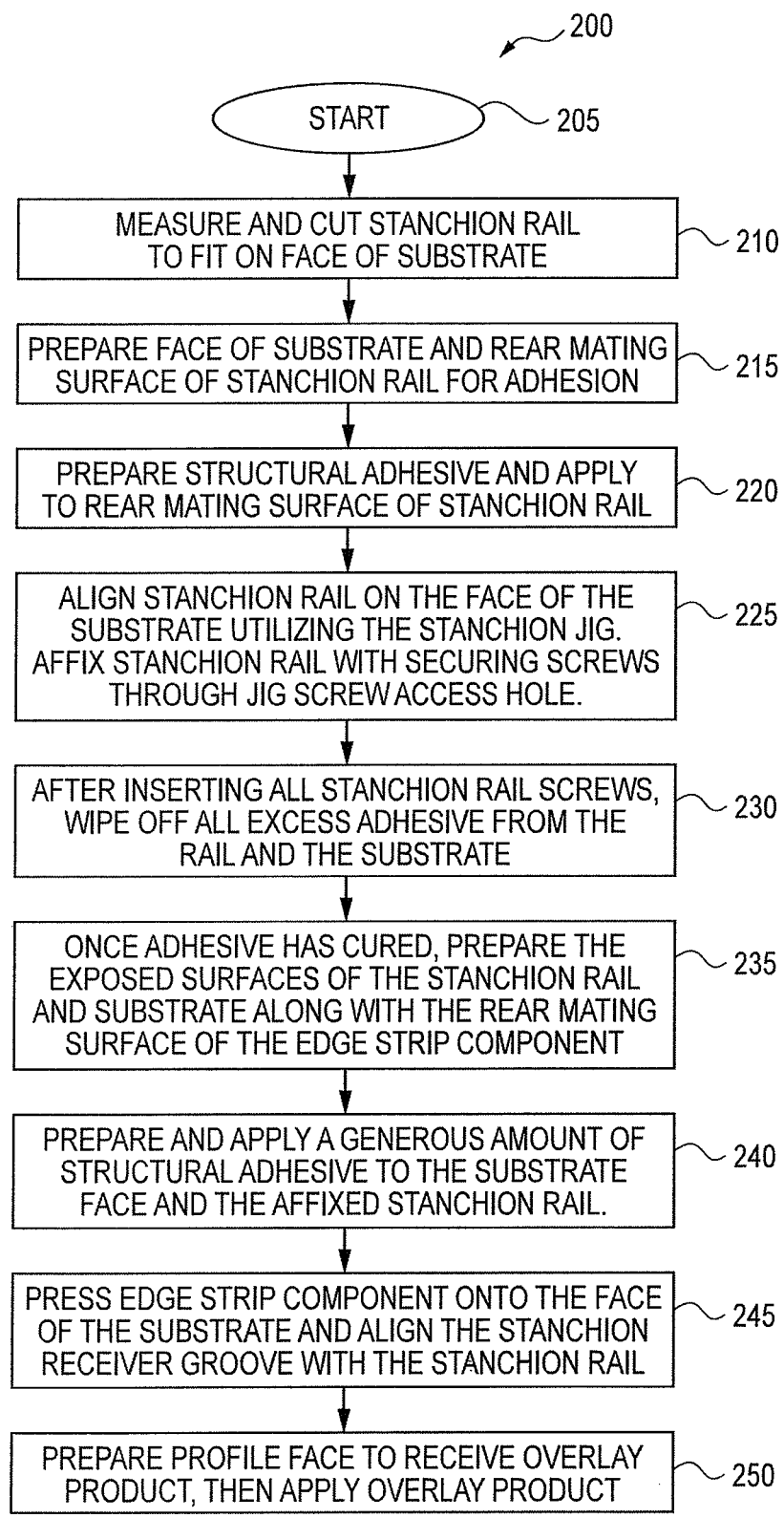
FIG. 9 is a flowchart of an installation method in accordance with the present subject matter.

FIG. 9 is a flowchart of a method for attaching and/or forming a profiled edge to a substrate. The method 200 is generally as follows. Upon beginning as denoted by item 205, a stanchion rail is appropriately measured and cut so as to fit along a desired region of a substrate of interest. In many applications, this will involve measuring and cutting the stanchion rail to fit along an edge or face of the substrate. In certain applications, the rail is sized so as to leave a space at each of its ends which is approximately 0.5 inches from the end of the substrate. These operations are collectively shown as 210.

The edge or face of the substrate along which the stanchion rail will contact is then prepared. Such preparation may involve wiping and/or cleaning the surface such as with a cleaning agent or solvent such as water or alcohol. Preparation may also involve modification of the surface such as by smoothing or alternatively, roughening. As described in greater detail herein, in many embodiments the stanchion rail is affixed to the substrate by the use of adhesive. And so, surface preparation typically includes operations that produce a substrate surface which promotes adhesion. These operations of preparing the substrate surface are generally denoted as item 215.

In operation 220, one or more structural adhesives are prepared and applied to the rear face of the stanchion rail. The present subject matter includes techniques in which the adhesive(s) are applied to the surfaces of the substrate, or to both sets of surfaces, i.e., the rear face of the stanchion rail and the substrate surface. These operations are collectively shown in FIG. 9 as 220.

Next, the stanchion rail is appropriately positioned and then contacted with the substrate. As previously noted, a layer of adhesive is disposed along the interface between the components. The stanchion rail is aligned with the substrate such as an upper surface or top of the substrate and/or along an edge of the substrate near the rail. Alignment can be performed and/or promoted by the use of a stanchion jig as described in greater detail herein. In certain versions, the aligned stanchion rail is secured to the substrate by one or more fasteners such as threaded fasteners or screws. Mechanical affixment can be used in addition to, or instead of, the use of adhesive. In certain versions, the stanchion rails are provided with one or more jig access apertures or holes. The threaded fasteners can be inserted through the jig access apertures. These operations are shown in FIG. 9 as operation 225.

After appropriately aligning and affixing the stanchion rail to the substrate, excess adhesive is removed from any exposed area(s) of the substrate. Failure to remove the adhesive may result in interference with a proper fit and engagement of a profiled edge strip(s) to the stanchion rail. Preferably, excess adhesive is removed immediately after or substantially immediately after affixing the stanchion rail. These operations are collectively shown as 230 in FIG. 9.

After the adhesive has cured or at least partially "set," the exposed surfaces of the stanchion rail, e.g., the outer face of the stanchion rail, are prepared for subsequent contact with edge strip(s). Similarly, receiving surfaces of the edge strip(s), e.g., the receiving channel or stanchion groove along a rear face of the edge strip(s), are also prepared for subsequent contact with the stanchion rail. Preparation of these surfaces typically involves wiping and/or cleaning to provide a surface for adhesive contact. These operations are collectively shown as 235 in FIG. 9.

In operation 240, one or more structural adhesives are prepared and applied to at least one of the outer face of the stanchion rail and the region of the substrate adjacent the rail. Preferably, adhesive is applied to the surfaces of both the rail and the substrate. In certain applications, it is preferred to apply a liberal amount of adhesive to both surfaces. Adhesive can also or instead, be applied to the rear or inner face of the edge strip. These operations are denoted as item 240 in FIG. 9.

In operation 245, the profiled edge strip(s) is positioned and adhered onto the substrate and the rail affixed thereto. Preferably, the edge strip(s) are engaged with the rail as a result of the stanchion rail being inserted and engaged within the receiving channel defined along the rear face of the edge strip(s).

The method 200 optionally includes an operation of preparing all or a portion of the exposed outer surface of the edge strip(s) to receive a layer or coating of an overlay product. Such preparation can include wiping the surface and/or cleaning the surface of the edge strip(s). One or more layers or coatings of an overlay product can then be applied. These operations are collectively denoted as operation 250.

It will be appreciated that the methods of the present subject matter may include a different sequence of operations than that described herein or shown in FIG. 9. Moreover, the methods can include additional operations. Furthermore, the methods may in certain applications omit one or more of the noted operations.

Figure 10:
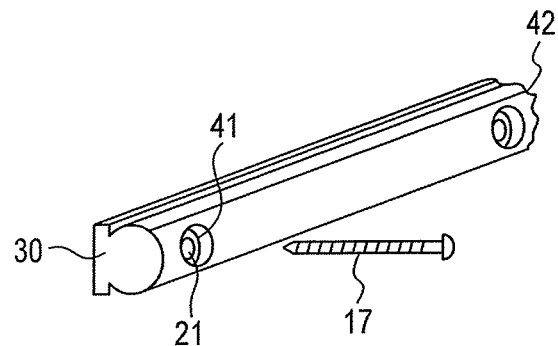
FIG. 10 is a partial perspective view of a stanchion rail in accordance with the present subject matter.

FIG. 10 is a partial perspective view of the stanchion rail 30. Screw holes 21 with an optional counter-bore 41 are located in multiple locations on the stanchion rail 30. A securing screw 17 or other threaded fastener fits in the holes 21 to solidly secure the stanchion rail to a substrate of interest. The counter-bore 41 provides the screw more surface area to promote engagement. An orientation groove 42 may be provided on the top of the rail 30 as an indicator of the topside when installing.

Figure 11:
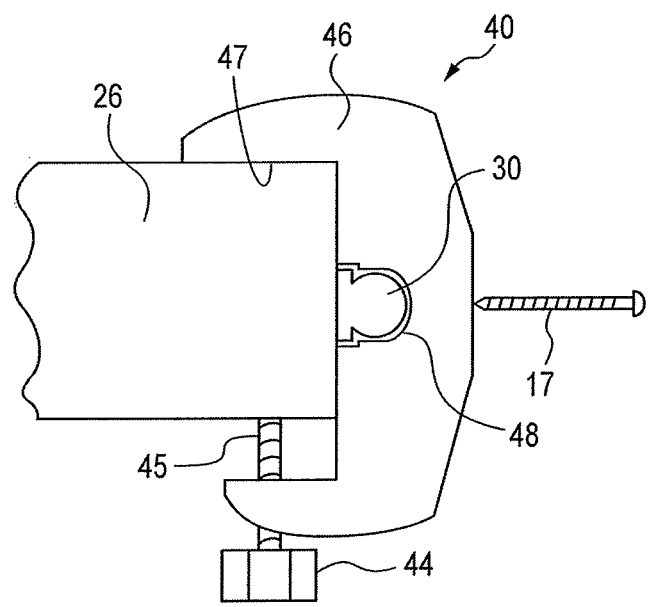
FIG. 11 is a detailed side view of a stanchion rail attached to a substrate with a stanchion rail jig in accordance with the present subject matter.

FIG. 11 is a detailed end or side view of a stanchion jig 40 attached to a substrate 26 with a stanchion railing 30. A main body 46 of the stanchion jig 40 aligns with the top of the substrate 26, and is secured to the substrate 26 by rotating a clamping knob 44 to tighten and counterclockwise to remove. Specifically, upon contacting an alignment surface 47 of the jig 40 main body 46 with an upwardly directed portion of the substrate 26, the jig 40 is releasably secured to the substrate 26 by engaging an end of the threaded member 45 with the substrate 26. The body 46 of the jig 40 is constructed of a composite, plastic, or metal material which prevents warping and can withstand the clamping forces applied. A portion of the main body 46 defines a stanchion rail harbor 48 which receives and aligns the stanchion rail 30 on the substrate 26 in appropriate location. One or more securing screws 17 can be used to secure the stanchion rail 30 to the substrate 26.

Figure 12:
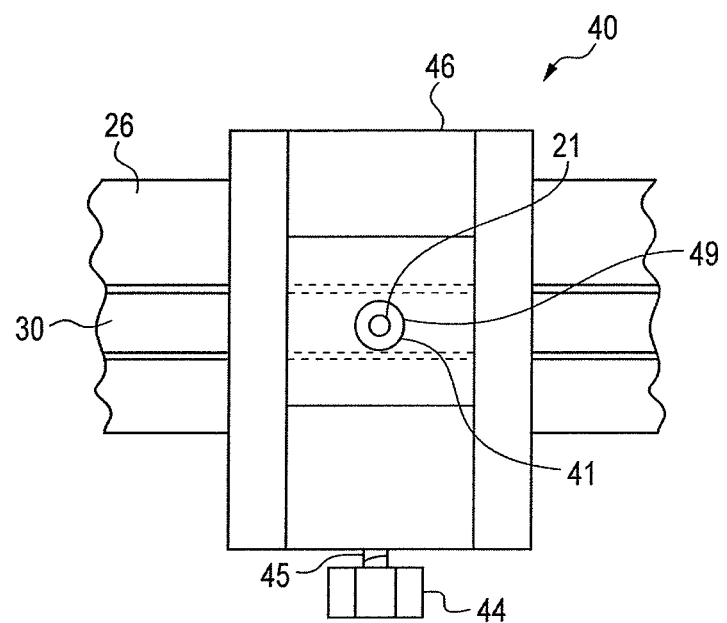
FIG. 12 is a front detailed view of the stanchion jig illustrated in FIG. 11 in accordance with the present subject matter.

FIG. 12 is a front detailed view of the stanchion jig 40 depicted in FIG. 11. The main body 46 of the jig 40 defines the stanchion harbor or receiving groove along a rear face (not shown) of the jig for receiving the stanchion rail 30. The main body 46 also has an opening 49 for providing easy access to screw holes 21 and/or counter-bore 41 defined in the stanchion rail 30 as also depicted in FIG. 10 to secure the stanchion rail 30 to the substrate 26. The clamping knob 44 and threaded component 45 are typically located in the center of the main body 46 to promote application of clamping force and alignment of the jig. Centrally locating the fastener access opening 49 in the main body 46 of the jig 40 also reduces the tendency of the jig and stanchion rail aligned therewith to twist or move undesirably with respect to the substrate 26.

Figure 13:
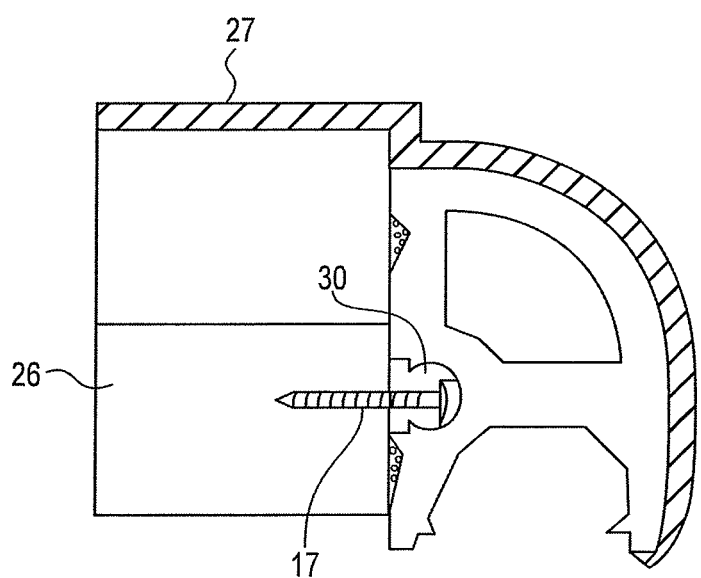
FIG. 13 is a cross sectional end view of an offset edge installation in accordance with the present subject matter.

FIG. 13 is a detailed end view of an offset edge installation. The edging system is installed in a lowered position relative to the substrate 26 so that when the overlay system 27 is installed a unique profile is attained. Specifically, the stanchion rail 30 is located below the standard installation height such as shown in FIGS. 1 and 11 for example, but not too low to cause a split in the substrate 26 when attaching the securing screw 17. Locating the edging system in this manner allows multiple edge configurations while using the same components used in a standard installation.

The present subject matter also relates to combining, orienting, and affixing one or more edge strips in such a manner so as to form a single continuous edge along a substrate of interest. For example, two edge strips having the same outer profile or different outer profiles can be positioned parallel and alongside one another and secured to a substrate to thereby form a single continuous edge.

Figure 14:
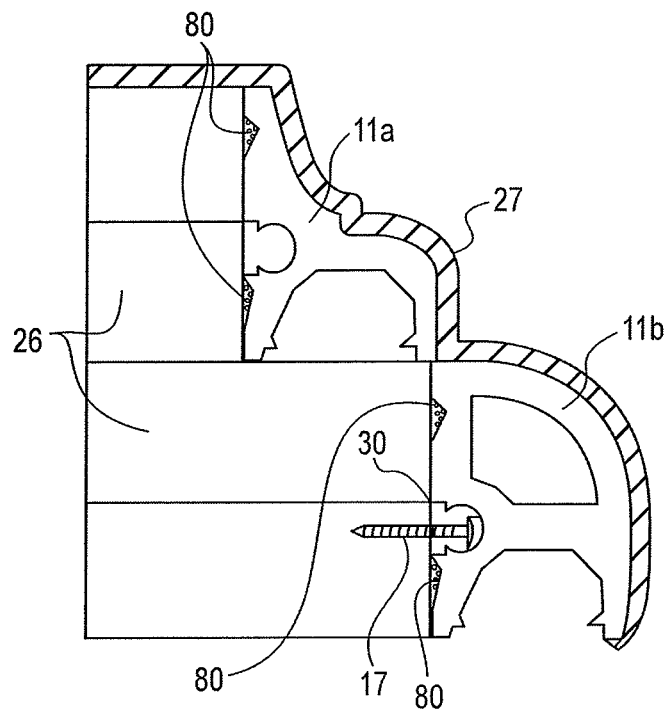
FIG. 14 is a cross sectional end view of multiple edges combined to form a continuous profile on a modified substrate in accordance with the present subject matter.

FIG. 14 is a detailed end view of multiple edge strips 11*a* and 11*b* combined to make one continuous profile on a modified substrate 26. The lower portion of the substrate 26 is offset to allow an upper edge strip 11*a* to be installed on top, while another edge strip 11*b* is installed on the lower face of the substrate. This provides a relatively large edge profile that will appear as a single continuous edge when the overlay system 27 is installed. The upper edge strip 11*a* does not require a stanchion rail 30 since the edge strip 11*a* rests on top of the substrate 26. The lower edge strip 11*b* uses the previously described installation configuration comprising the stanchion rail 30 and securing screw(s) 17. One or more regions of adhesive 80 are typically provided in grooves or along the interface between the edge strips 11*a* and 11*b* and the substrate 26.

Figure 15:
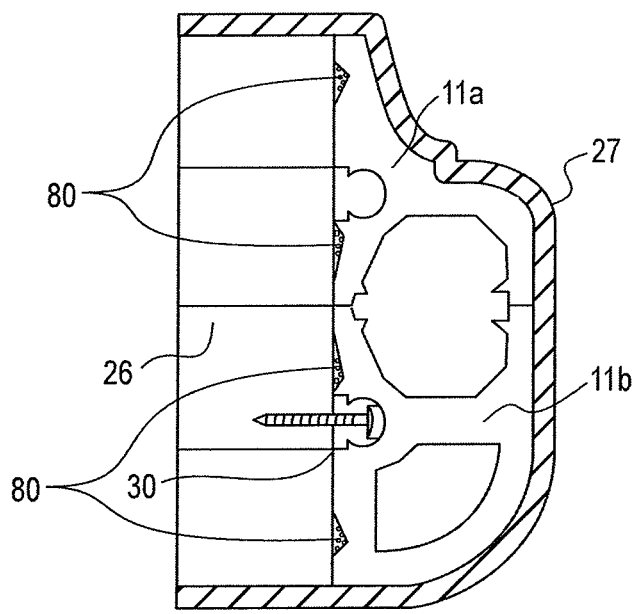
FIG. 15 is a cross sectional end view of multiple edges combined to form a continuous profile on a flat substrate in accordance with the present subject matter.

FIG. 15 is a detailed end view of another arrangement of multiple edge strips combined to form a single continuous profile on a flat substrate. Profiled edge strips 11*a* and 11*b* are combined as desired. The combined edge strips are then applied to the substrate 26 as previously described herein with a single stanchion rail 30 fittingly engaged to the lower edge strip 11*b*. The overlay system 27 then covers the resulting outer edges of the edge strips 11*a* and 11*b* thus making the edges appear as one continuous profile or edge. In applications in which the thickness of the substrate 26 may be selected, it is desirable to form the thickness to be equal to the total height of the combined edge strips 11*a* and 11*b*. One or more regions of adhesive 80 are typically provided in grooves or along the interface between the edge strips 11*a* and 11*b* and the substrate 26.

The present subject matter also relates to orienting or positioning one or more edge strips relative to a substrate to provide different configurations and edge profiles. In one particular orientation, an edge strip is inverted as compared to arrangements such as shown in FIG. 1. In an inverted position, if the edge strip includes a channel such as previously noted channel 15, the edge strip can also receive a wide array of visually aesthetic features such as colored materials, inlay materials, and/or lighting provisions incorporated in the channel.

In an inverted installation, the integrated channel provides a recess which can be filled with a variety of materials from nature or man made. Filling the channel can be performed in a number of different ways. One can mix raw materials, such as seashells, in with a clear polymeric resin in a separate container. Once mixed, the raw materials submerged in resin can be poured into the channel and left to setup. When using light raw materials, they may tend to float on top and can protrude above the finished surface. Another method is to pour a small amount of resin into the base of the channel, then add the raw materials positioning them as desired. Once the base layer of resin has set, locking in the raw materials, a second pour is performed to fill the channel completely bringing the top surface of the channel flush with the rest of the top surface. Another method for inlay materials is to combine dyes, metallic powders, and/or pearlescent pigments with resin or another binding agent to create custom effects that can be poured or otherwise placed into the channel.

Figure 16:
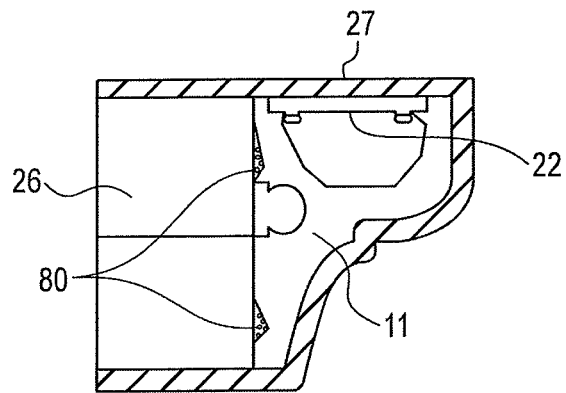
FIG. 16 is a cross sectional end view of an inverted profile installation with an overlay system covering all exposed surfaces of the profiled edge strip in accordance with the present subject matter.

FIG. 16 is a detailed end view of an inverted profile installation with an overlay system 27 covering all aspects or exposed surfaces of an edge strip 11. In this orientation the channel cap 22 is structurally bonded or welded to the inverted edge strip 11. This provides a flat, strong surface for the overlay system 27 to be installed on encompassing all portions of the profiled edge strip 11.

Figure 17:
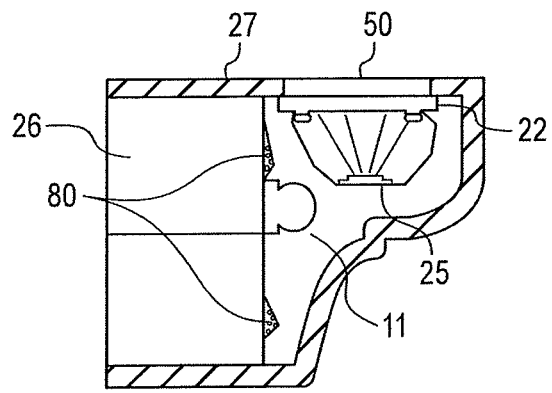
FIG. 17 is a cross sectional end view of an inverted profile installation with optional lighting provisions in accordance with the present subject matter.

FIG. 17 is a detailed end view of an inverted profile installation with an optional lighting provision. A clear/translucent channel cap 22 is structurally bonded to the edge strip 11. The overlay system 27 is installed up to the sides of the channel cap 22, leaving the complete channel cap exposed to allow light to pass through the channel cap 22. A clear/translucent resin 50 or other suitable material is then applied over the channel cap 22 to render the top surface flush while allowing light to shine through. A lighting device 25 is installed in the channel and is directed upwards.

Figure 18:
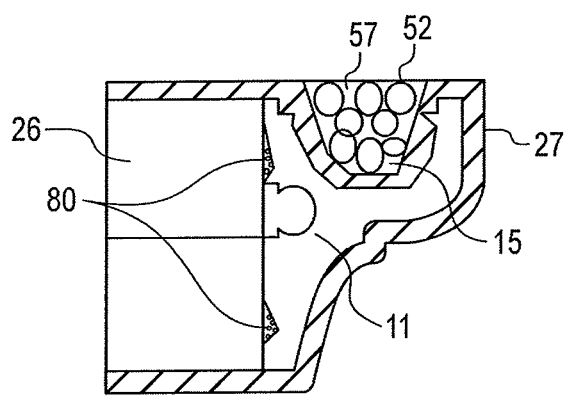
FIG. 18 is a cross sectional end view of an inverted profile installation with optional inlay materials in accordance with the present subject matter.

FIG. 18 is a detailed end view of an inverted profile installation with optional inlay materials. The edge strip 11 is installed in an inverted manner with overlay system 27 applied following the contours or outer surface of the edge strip 11. In this configuration, a channel cap is not used. This produces a recess or groove from channel 15 in which inlay materials 52 and compatible adhesive 57 can be located. The inlay materials 52 can be many materials including metal, pearl, earthy materials such as rock and shells, or can be synthetic materials.

Although it is contemplated that the present subject matter edging systems will be used by affixment to vertical edges of horizontal substrates, it is also envisioned that the edging systems can be used in association with non-horizontal substrates such as for example, vertically oriented substrates. The edging systems can be affixed to side or top edges of vertically oriented substrates. It will be appreciated that the present subject matter edging systems can be used in a wide range of positions and installation orientations.

Figure 19:
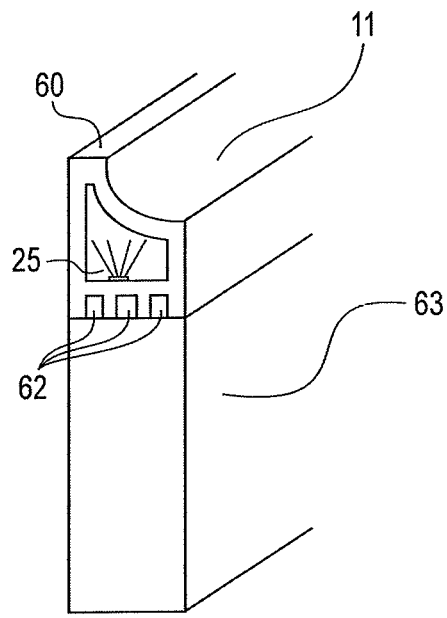
FIG. 19 is a perspective view of a profiled edge strip in a vertical orientation without an overlay system in accordance with the present subject matter.

FIG. 19 is a perspective view of a profiled edge strip 11 in a vertical orientation without an overlay system. The edge strip 11 defines an outer distal edge 60. In certain embodiments, the edge 60 is made of a clear or translucent material. The edge strip 11 is installed with structural adhesive in a plurality of slots 62 defined along a face of the edge strip 11 and which are disposed immediately adjacent to the vertically oriented substrate 63. An optional lighting device 25 is disposed within the edge strip 11 for providing illumination through the clear/translucent material of the edge 60. There is no overlay system installed.

Figure 20:
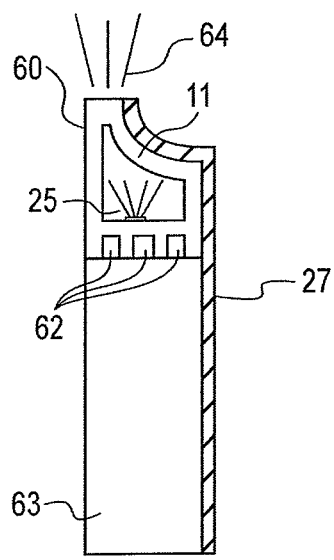
FIG. 20 is a cross sectional end view of a profiled edge strip in a vertical orientation with an overlay system installed in accordance with the present subject matter.

FIG. 20 is a detailed end view of a profiled edge strip 11 in a vertical orientation with an overlay system 27 installed. The edge strip 11 is installed with structural adhesive disposed in multiple slots 62 oriented to a vertical substrate 63. The multi-slot configuration provides an increased surface area for the adhesive and promotes retention of the edge strip 11 and prevents lateral displacement. A lighting device 25 is disposed in the channel of the edge strip 11 and faces upward to project light. The overlay material 27 is applied to the front face but typically not applied on the edge 60, thereby maintaining the clear/translucence properties of the edge 60 so that light 64 can pass through the edge 60.

The present subject matter also relates to edging systems that can be used in association with substrates that are formed directly alongside the edging system. For example, one or more flowable materials such as polymeric resins, adhesives, or other curable materials can be deposited directly alongside one or more edging systems and then cured or otherwise hardened to thereby form an integral substrate having a profiled edge as desired.

Figure 21:
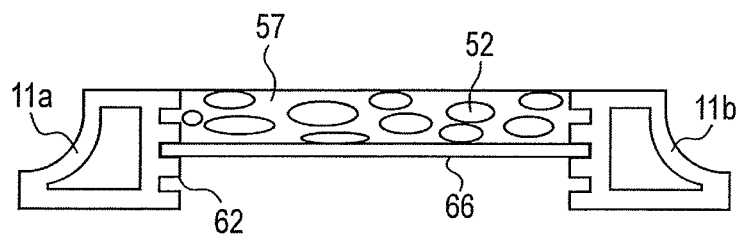
FIG. 21 is a detailed end view of profiled edge strips used as borders along a clear substrate, resin, and/or inlay materials in accordance with the present subject matter.

FIG. 21 is a detailed end view of profiled edge strips 11a and 11b used as borders positioned along edge regions of clear substrate, resin, and/or inlay materials. The edge strips 11a and 11b are oriented with multiple slots 62 facing each other in a generally horizontal orientation. A solid piece of substrate material is located in the appropriate multi-slot 62 on each side and secured with structural adhesive. This creates a sealed base 66 which allows for material such as a flowable resin material to be deposited in the base. Inlay materials 52 and compatible adhesive 57 are then installed on top of or within the sealed base 66. Upon curing of the adhesive or resin, this creates a solid article which can be used in a horizontal or vertical position such as a backsplash or table. The use of this method allows for a reduction in inlay materials 52 and compatible adhesive 57, thereby reducing weight and cost while still achieving the same effect.

Figure 22:
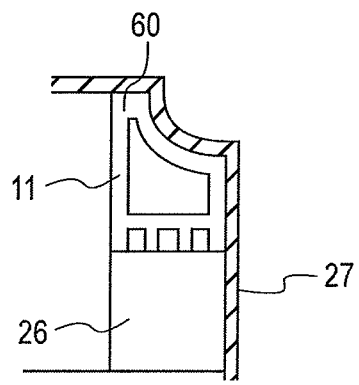
FIG. 22 is a cross sectional end view of a profiled edge strip installed on a modified substrate to provide a desired profile in accordance with the present subject matter.

FIG. 22 is a detailed end view of a profiled edge strip 11' installed on a modified substrate 26 to provide a different profile. Specifically, the edge strip 11 including a clear or translucent distal edge portion 60 is installed on a modified substrate 26. An overlay system 27 is then applied. The overlay system 27 can be applied in such a manner so as to leave one or more regions of the edge strip 11 and particularly the clear/translucent edge region 60 exposed. The clear/translucent edge region 60 allows for portions of the edge to be clear and light to shine through.

Figure 23:
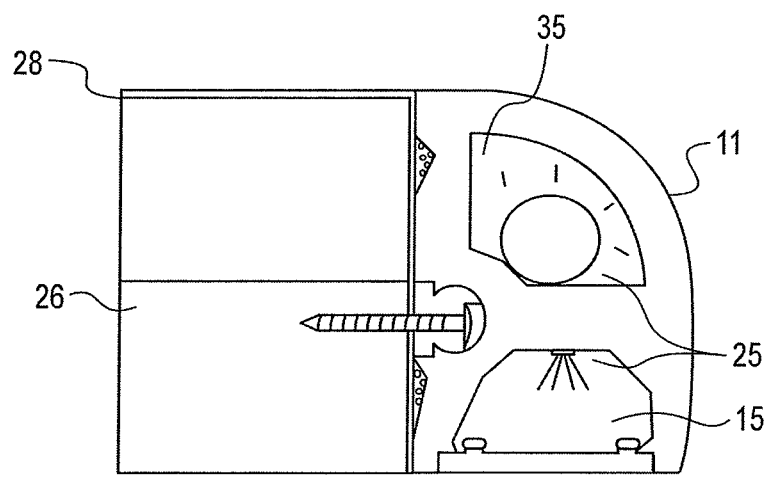
FIG. 23 is a detailed end view showing installation of an illuminated clear or translucent profiled edge strip to an existing substrate without overlay in accordance with the present subject matter.

FIG. 23 is a detailed end view showing installation of an illuminated clear/translucent profiled edge strip 11 to an existing substrate 26 having an existing overlay 28, and without a new overlay. The edge strip 11 is installed as previously described herein and upon the existing overlay system 28 and substrate 26. The edge strip 11 can be formed from clear or translucent material. Lighting devices 25 can be located in both the edge strip hollow 35 and channel 15.

Generally, all of the previously described edge strips or edging systems are used as follows. One measures the substrate 26 that the edge is to be attached to, then, if a stanchion rail is used, cuts the stanchion rail 30 to the appropriate length. The stanchion rail 30 is preferably aligned to the face of the substrate with the stanchion jig. The rail 30 is then secured to the substrate 26 with securing screws 17. Structural adhesive may also be applied to the rear of the stanchion rail 30 to provide an even stronger bond. Once the stanchion rail is set, one measures and cuts the profiled edge strip 11 to be applied. These operations may involve forming mitre joints for corners, along with straight pieces. To create an inside corner one could cut a 45 degree angle on the right side of one edge strip and the left side of the adjoining edge strip. The cutting direction results in the rear of edge strip being longer than the front. The end of the edge strip component can be filled with a suitable putty or other filler material. The edge strip 11 should then be dry fit to ensure proper fit and alignment of the pieces. Next, one applies adhesive to the rear mating surface 14, filling the rear grooves 13 as well, and pressing firmly against the profiled edge strip 11 while aligning the strip with the stanchion receiving groove 34 to affix the strip to the substrate 26 and stanchion rail 30. Clamps are not required as the stanchion rail 30 supports and aligns the profiled edge strip. Once the structural-adhesive has set, any excess adhesive can be removed such as by sanding. The edge and substrate 26 for the overlay system 27 are then prepared according to the manufacturer and/or supplier of the overlay system. The overlay system 27 is applied to the substrate 26 and profiled edge strip 11 per the manufacturer's instructions, preferably utilizing tools designed for that purpose. This creates a seamless transition from the substrate 26 to the profiled edge strip 11. Once the overlay system 27 has cured, the channel cap 22 is installed. If under counter lighting is desired, a low voltage lighting device 25 is provided in the channel 15 along with a clear or translucent channel cap 22 to allow light to shine through and emit beneath the edge.

In many embodiments of the present subject matter edging system, the profiled edge strips are provided with a plurality of recesses or grooves extending along an inner face of the edge strip. In these embodiments, the edge strip may also define a receiving channel for receipt and/or engagement with a stanchion rail as previously described. However, in particular versions of these embodiments, the edge strips do not include a receiving channel for a stanchion rail, and so as will be appreciated, do not require use of a stanchion rail.

The plurality of grooves defined along the inner face of an edge strip in this version of the present subject matter can be in a wide array of shapes and forms. Typically, the plurality of grooves extend along the length of the edge strip or at least along a portion of the length. The plurality of grooves are preferably oriented parallel to one another, however a wide array of other arrangements are contemplated. The plurality of grooves can range from 2 to about 6 or 7 in number, with 3 being generally preferred. A particularly preferred configuration for the adhesive-receiving grooves along the inner face of the edge strip is a set of 3 parallel grooves extending along the length of the edge strip, and spaced apart from one another. Of the 3 grooves, the medial or groove located between the other 2 grooves is preferably larger in terms of at least one of depth and width as compared to each of the outer located grooves. This configuration has been found to provide excellent performance when the edge strip is adhered to a substrate of interest. In certain versions of a set of 3 grooves, it is preferred to form the medial groove so as to exhibit a square or rectangular cross section. In still other versions of the set of 3 grooves, it is preferred to form the outer 2 grooves to each exhibit a triangular cross section. The present subject matter includes combinations of any of these aspects.

Figure 24:
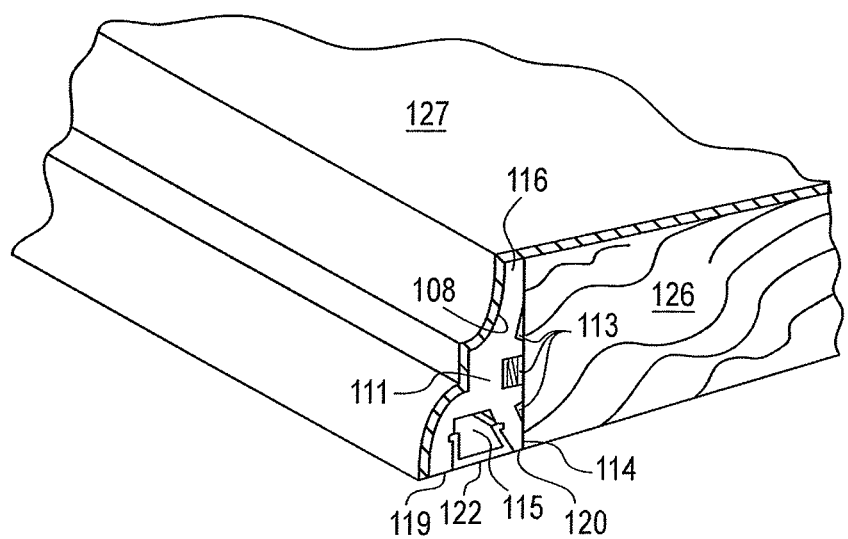
FIG. 24 is a perspective view of an installed edge system in accordance with the present subject matter.

FIG. 24 is a perspective view of an installed edging system which does not use a stanchion rail. The edging system generally comprises a profiled edge strip 111 having a plurality of grooves 113 defined along a rear or inner face 114 of the edge strip 111. In this version of the edging system, a stanchion rail is not used and instead, the previously noted set of 3 parallel grooves and adhesive are used. An overlay system 127 resides on top of a substrate 126, a top edge 116 of the edge strip 111 and an outer face 108 of the edge strip 111. The rear mating surface 114 defines grooves 113 and is adjacent to the substrate 126. A rearward bottom edge 120 is aligned vertically with the base of the substrate 126. A channel 115 is accessible along the bottom of the edge strip 111, and is covered with a channel cap 122. A forward bottom edge 119 completes the underneath portion of the edge strip 111. The edge strip is made of wood, plastic, composite or other suitable material, as previously described.

Figure 25:
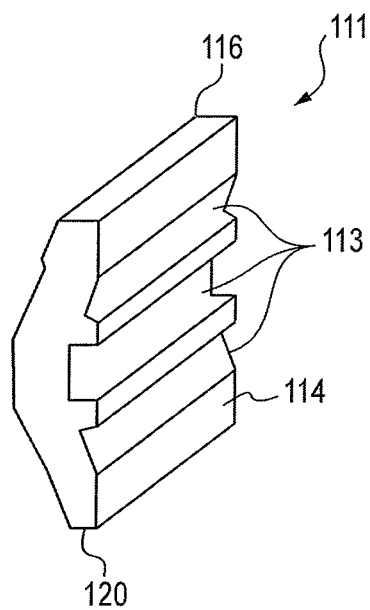
FIG. 25 is a rear perspective view of a profiled edge strip in accordance with the present subject matter.

FIG. 25 is a rear perspective view of a profiled edge strip 111. The rear mating surface 114 may include a rough, adhesion promoting texture. The rear surface extends between a top edge 116 and a bottom edge 120. Rear grooves 113 are recessed into the rear mating surface 114 to reduce material and weight, along with reducing warpage of the part. The rear grooves 113 also provide a larger surface area for adhesive and ridges to prevent vertical displacement.

Figure 26:
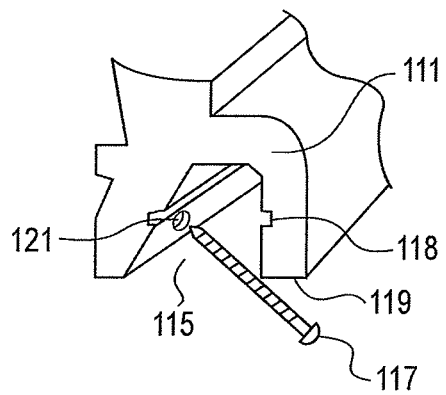
FIG. 26 is an end view of a profiled edge strip with a threaded fastener used for affixment in accordance with the present subject matter.

FIG. 26 is a partial end view showing an edge strip 111 and a mechanical fastener such as a screw 117. A channel groove 118 receives retaining portions of a channel cap (not shown), and also provides an area for tools or other articles to be retained. A screw hole 121 is located in the channel 115 at a location where it will not inhibit the use of the channel groove 118, and will not affect any tooling or other items installed in the groove. The securing screw 117 is preferably installed at an angle to avoid interference from the forward bottom edge 119.

Figure 27:
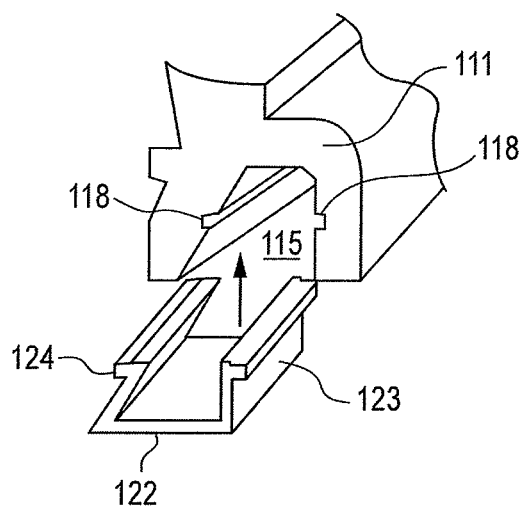
FIG. 27 is a partially exploded end view of a profiled edge strip showing the installation of a channel cap in accordance with the present subject matter.

FIG. 27 is a partially exploded end view of another profiled edge strip 111 showing the installation of a bottom cap 122. A groove 118 resides on both inside surfaces of the channel 115 to receive the channel cap 122. The channel cap front 123 has a protruding feature that fits into the channel groove 118 on the inside forward surface of the channel 115. The channel cap rear 124 is oriented at an angle to match the angle of the rear of the channel 115, along with a protruding feature that fits into the channel groove 118 on the inside rear surface of the channel 115.

Figure 28:
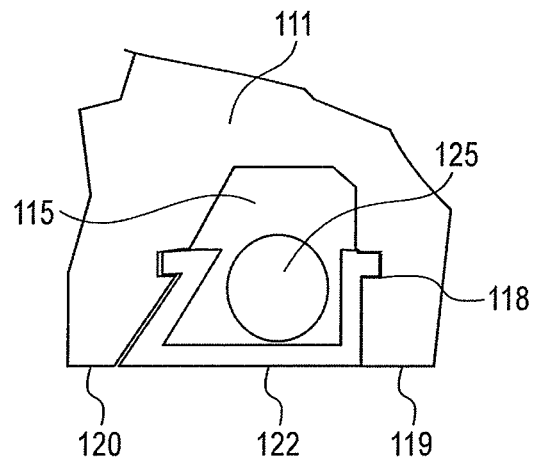
FIG. 28 is an end view of a profiled edge strip with a transparent or translucent channel cap installed, along with optional lighting provisions in accordance with the present subject matter.

FIG. 28 is an end view of a profiled edge strip 111 with the channel cap 122 installed, along with a lighting feature. The bottom edge of the channel cap 122 aligns flush with the rearward bottom edge 120 and forward bottom edge 119 of the edge strip 111 when secured via the channel groove 118 in the channel 115. The channel cap 122 can be any solid color, or clear/translucent and made of plastic, acrylic, or another suitable material, as previously described. When clear or translucent material is used for the channel cap 122, a low voltage lighting device 125 can be installed in the channel 115. The low voltage lighting device 125 shown is a fiber optic side glow cable, but any low voltage lighting device or light distributing component can be used.

Figure 29:
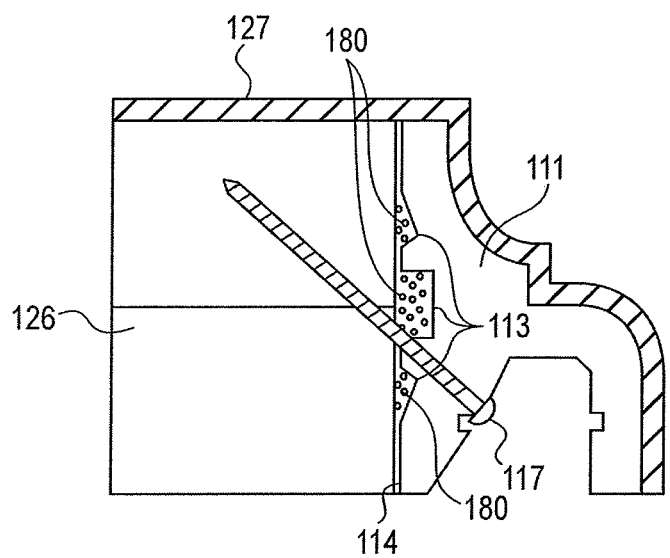
FIG. 29 is a cross sectional end view of a profiled edge strip attached to a custom built countertop substrate in accordance with the present subject matter.

FIG. 29 is a detailed end view of an edging system attached to a custom-built countertop substrate 126. An adhesive layer 180 is disposed between the rear mating surface 114 of an edge strip 111 and the substrate 126. A collection of the rear grooves 113 contain relatively large amounts of adhesive 180 to prevent vertical shift once the adhesive is cured. A securing screw 117 is installed at an angle to mechanically fasten the edge strip 111 to the substrate 126. An overlay system 127 is installed on top of the substrate 126 and edge strip 111 to provide a finished countertop.

Figure 30:
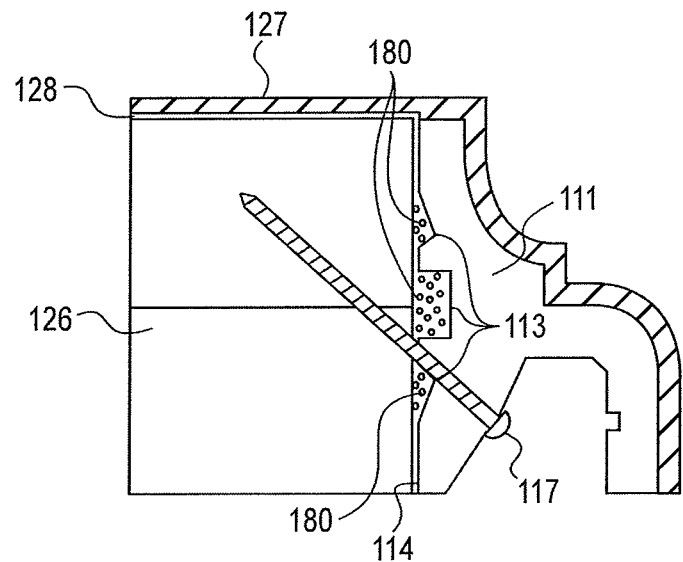
FIG. 30 is a cross sectional end view of a profiled edge strip attached to an existing laminate countertop substrate in accordance with the present subject matter.

FIG. 30 is a detailed end view of a profiled edge strip 111 attached to a countertop 126 with an existing overlay system 128. An adhesive layer 180 is disposed between the rear mating surface 114 of the edge strip 111 and the existing overlay system 128. The rear grooves 113 contain relatively large amounts of adhesive 180 to prevent vertical shift of the edge strip 111 once the adhesive is cured. A securing screw 117 is installed at an angle to mechanically fasten the edge strip 111 to the existing overlay system 128 and substrate 126. This ensures a proper bond that is not dependent on the adhesive properties of the existing overlay system 128. An overlay system 127 is installed on top of the existing overlay system 128 and edge to provide a finished countertop.

Figure 31:
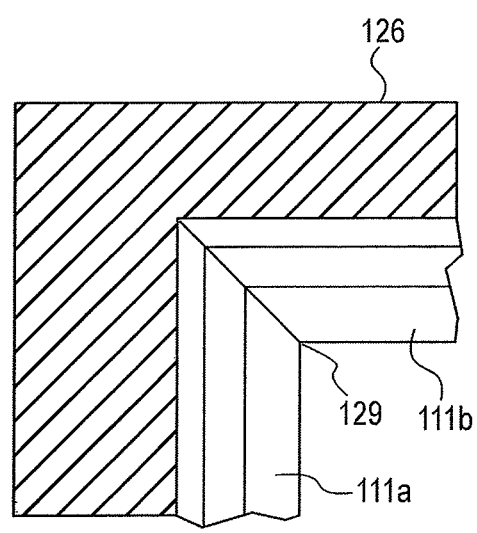
FIG. 31 is a top view of a countertop having an inner corner and mitred profiled edge components attached thereto to form a ninety degree angle in accordance with the present subject matter.

FIG. 31 is a top view of a countertop 126 having an inside corner 129 using the present subject matter edging system. The inside corner 129 is attained by cutting 45 degree mitre angles on each edge strip 111a and 111b in opposing directions. The edge strips 111a and 111b are attached to the substrate 126 with the edge strips facing outward to form a 90 degree inside angle.

Figure 32:
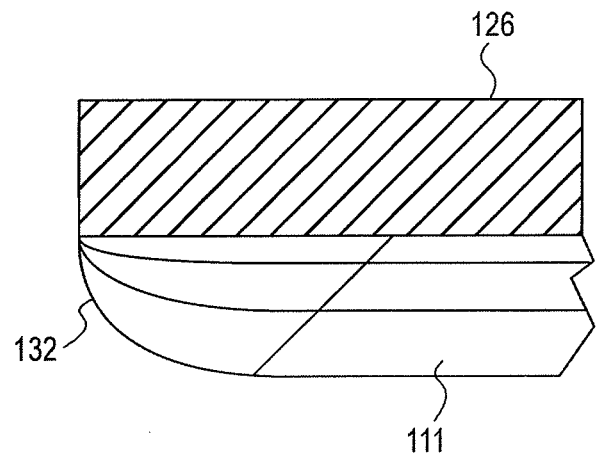
FIG. 32 is a top view of a countertop with a modular gradual termination edge component in accordance with the present subject matter.

FIG. 32 is a top view of a countertop 126 with a modular end cap 132. The end cap 132 shown provides a gradual termination from the edge strip 111 along a distal region to the end of the substrate 126. Variations of an end cap 132 provide different aesthetic appearances.

Figure 33:
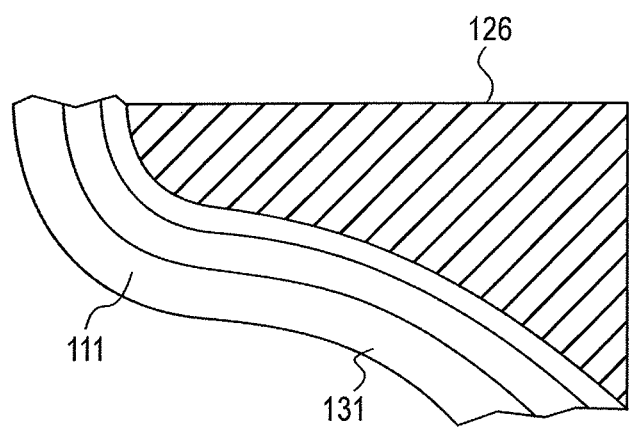
FIG. 33 is a top view of a countertop with a flexible edge component installed, allowing for a freeform edge contour in accordance with the present subject matter.

FIG. 33 is a top view of a countertop 126 with a flexible edge 131 installed. The substrate 126 has a contour providing a unique design element. A flexible edge 131 preferably follows the contour of the substrate 126 while maintaining the aesthetic details of the edge strip 111.

In operation, the edging systems depicted in FIGS. 24-33 can generally be used as follows. One measures the substrate 126 that an edge strip 111 is to be attached to, then cuts the edge strip to the appropriate length. To create an inside corner 129 as shown in FIG. 31 one would cut a 45 degree angle on the right side of one edge strip and the left side of the adjoining edge strip. The cutting direction results in the rear of each piece being longer than the front. If an end cap 132 is necessary or desired, the length of which must be subtracted from the length of the edge. The edge should then be dry fit to ensure proper fit and alignment of the pieces. Adhesive is applied to the rear mating surface 114 of the edge strip, filling the rear grooves 113 as well. The top edge 116 of the strip 111 is aligned with the top surface of the substrate 126. The strip is pressed firmly against the substrate 126. Clamps may optionally be applied to ensure proper vertical alignment and to prevent movement when installing the securing screw 117. Next, the securing screw 117 is inserted into the screw hole 121 in the channel 115 from underneath the edge and tightened until the edge is snug to the substrate 126. After the adhesive has sufficiently cured, any excess adhesive may be removed such as by sanding. The edge strip and substrate 126 are then prepared for the overlay system 127 according to the manufacturer or supplier of the overlay product. The overlay system 127 is applied to the substrate per the manufacturer's instructions, preferably utilizing tools designed for that purpose. This creates a seamless transition from the substrate 126 to the edge strip 111. Once the overlay system 127 has cured, the channel-cap 122, if used, can be installed. If under counter lighting is required, one or more low voltage lighting devices 125 is incorporated in the channel 115 along with a clear or translucent channel cap 122 to allow the light to shine through and emit beneath the edge.

Figure 34:
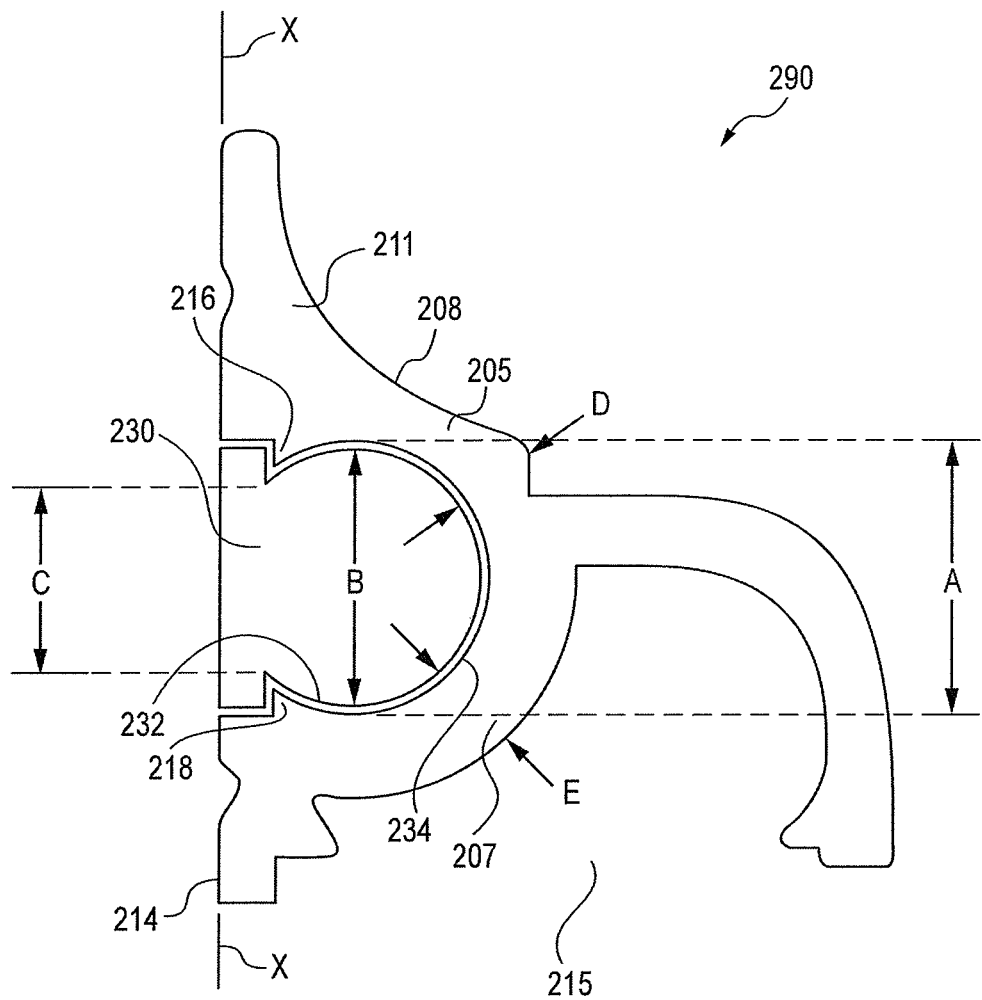
FIG. 34 is a schematic cross sectional view of an edge component engaged with a stanchion rail illustrating additional aspects of the present subject matter.

The present subject matter also provides particular engagement configurations between the edge strips and the stanchion rails. It will be understood that one or more of these aspects can be used in conjunction with any of the other features and aspects of the present subject matter when using stanchion rails. Referring to FIG. 34, an engagement system 290 is depicted comprising an edge strip component 211 engaged with a stanchion rail 230. The edge strip 211 defines an outer face 208 and an oppositely directed inner or rear face 214. The edge strip 211 may also define an optional channel 215 as previously described herein. The edge strip 211 further defines a stanchion groove 234 accessible along the rear face 214. In the particular version shown in FIG. 34, the edge strip 211 also includes two capture projections 216 and 218 extending from the interior wall defining groove 234 and generally located proximate a plane X along which the rear face 214 extends. The capture projections 216 and 218 are typically located opposite one another as shown. The capture projections are flexible upon being subjected to a force, and serve to releasably retain the stanchion rail 230 when disposed in the groove 234. When the capture projections 216 and 218 are in a non-disturbed state, they are spaced apart by a distance C as shown in FIG. 34. Distance C is taken in a direction transverse to the longitudinal axis of the edge strip 211. Thus, distance C is generally taken in a direction parallel with the plane X. And as explained in greater detail, distance C generally corresponds to the minimum access dimension of the groove 234. The stanchion rail 230 defines an outer arcuate surface 232. The stanchion rail 230 is typically sized so that its maximum span taken in a direction parallel with distance C, i.e. the minimum access dimension of the groove 234, is slightly greater than distance C. This maximum span of the stanchion rail 230 is shown in FIG. 34 as distance B. In certain versions of the engagement system 290, the components are sized and configured such that particular dimensional ratios exist between the maximum span of the stanchion rail 230, i.e. distance B, and the minimum access span of the groove 234, i.e. distance C. Thus, referring to FIG. 34, the groove 234 defines the minimum span shown as distance C. As noted, distance C is parallel to distance B associated with the rail 230. Although not wishing to be limited to any particular ratios, typically, distance C is from about 90% to about 99% of distance B, more particularly from about 92% to about 98% of distance B, and in certain versions about 95.5% of distance B. Therefore, by forming (i) the stanchion rail 230 to exhibit a maximum span B having a particular size relative to the minimum access span C defined by the edge strip 211, and (ii) the capture projections 216 and 218 from a material which permits their displacement and flexure; an engagement system 290 is provided which enables releasable engagement and easy separation between the rail 230 and the strip 211.

Another aspect of the engagement system 290 relates to a particular configuration for the edge strip which promotes easy, i.e. application of relatively low forces to the strip, removal of the strip from the stanchion rail. This is particularly useful when "dry fitting" the edge strip(s) to an installed stanchion rail. Referring to FIG. 34, the edge strip 211 is configured to exhibit a thinner wall in upper regions of the strip such as at location 205 as compared to lower regions of the strip such as at location 207. The reference to "lower" refers to locations in the sidewall of the strip 211 forming the groove 234 closer to the channel 215. Thus, the present configuration which further provides easy removal of the strip 211 from an installed or mounted stanchion rail 230 involves forming the edge strip 211 so that an upper sidewall such as at location 205 has a thickness dimension shown as distance D which is less than a thickness dimension of a lower sidewall such as at location 207, shown as distance E. The provision of a thinner upper sidewall enables the material of the edge strip 211, typically a plastic, to flex and allow disengagement of the strip from the rail. Moreover, particular dimensional ratios have been identified as providing easy removal. Generally, the ratio of an upper sidewall thickness D to a lower sidewall thickness E is from about 30% to about 80%, more particularly from about 40% to about 70%, and in certain versions, from about 45% to about 55%.

As previously described, in many applications, one or more structural adhesives are used in securing the stanchion rail to an edge of a substrate, and/or for securing a profiled edge strip to a stanchion rail and/or substrate edge. Although these two adhesives can be different, in many applications it is preferred that these adhesives be the same, i.e. be the same compositionally and/or with regard to their physical properties and curing aspects. A wide array of commercially available adhesives and/or adhesive systems can be used. Non-limiting examples of such adhesives include polyurethane construction adhesives such as those available under the designation LIQUID NAILS from AkzoNoble; polyurethane adhesives designated as LOCTITE available from Henkel; and epoxy adhesives available from Ecopoxy of Providence, R.I. and ResinLab of Germantown, Wis. Although both two part adhesives and single part adhesives can be used, it is generally more economical to use single part adhesives. In certain applications, it is contemplated that a two part adhesive system may be preferred for affixment of a stanchion rail to a substrate rather than a single part adhesive due to the relatively fast set up and/or cure times associated with many two part adhesives.

In certain applications, it may be desired to provide a stanchion rail and a profiled edge strip which feature one or more irregular or nonconforming mating surfaces. Specifically, either the outer surface of the stanchion rail or the inner surface of the stanchion rail groove defined along the inner face of the edge strip, or both sets of surfaces, can be configured so that when their respective components are mated together, at least portions of the surfaces do not contact one another and the mating inferface(s) include voids or gaps. Thus, when a structural adhesive is deposited along the mating interface, the voids or gaps retain significantly large amounts of adhesive. In certain applications, this practice can result in improved bonding between stanchion rail and edge strip(s). Furthermore, this nonconforming aspect can also facilitate easier installation or engagement of the edge strip to a stanchion rail, and easier removal of the edge strip from a stanchion rail. Easier engagement and/or removal of an edge strip relative to a stanchion rail may be desirable when dry fitting one or more edge strips to an installed stanchion rail.

In still another aspect of the present subject matter; the size, shape, and/or cross sectional profile of the stanchion rail can be selected to promote or in certain embodiments enable, easy engagement and separation with an edge strip having a receiving groove. For example, it is contemplated that for certain edge strips such as those depicted in FIGS. 3, 6, or 7 for instance in which the edge strips have a "bull nose" cross sectional profile; the edge strips do not easily flex or undergo deformation upon being subjected to forces associated with typical installations. And so, a corresponding stanchion rail can be provided with a cross sectional profile that promotes or enables easy engagement or separation with such edge strips. Specifically, the outwardly extending or bulbous portion of a stanchion rail can be provided to exhibit a particular shape or have certain dimensions to facilitate easy insertion or removal of the bulbous portion of the stanchion rail with a receiving groove of an edge strip. Typically, the shape of the bulbous portion is different from that of the receiving groove of the edge strip of interest, and so the shape of such stanchion rail bulbous portion is referred to herein as nonconforming. Thus, use of a stanchion rail having a bulbous portion with a nonconforming cross sectional profile enables easy engagement or removal from relatively stiff or rigid edge strips.

Although the various edging systems can be used without one or more overlay products, it is contemplated that many applications will involve use of an overlay in conjunction with the edging system. Typically, and as previously described herein, after attaching a profiled edge strip to a substrate such as a countertop edge, an overlay material can be applied directly upon the substrate and the edge strip. The overlay material is typically initially in a liquid or flowable state and is applied to the substrate and edge strip by known coating techniques. After application of the overlay material, the material hardens, cures, and/or otherwise solidifies to form a hard outer surface.

A wide range of overlay systems are known and are commercially available. Concrete-based overlay materials are known such as those available from a variety of suppliers under the designation GRANICRETE; ICOAT products available from Concrete Products of Phoenix, Ariz.; and Elite Crete Systems of Valparaiso, Indiana. Epoxy and/or paint-based overlay systems include RUST-OLEUM countertop paint available from RPM International of Medina, Ohio; RUST-OLEUM kitchen transformation products also available from RPM International; MODERN MASTERS TRANSFORMATION countertop systems also available from RPM International; and GIANI granite paint available from Giani, Inc. of St. Louis, Miss. It will be appreciated that in no way is the present subject matter limited to any of these particular overlay systems and/or overlay materials. Instead, the edging systems of the present subject matter can be used with a wide range of overlay materials or resurfacing products.

Preferably, the profiled edge strip and the stanchion rail of the edging system are formed from the same material(s). Most preferably, the material(s) of the profiled edge strip and the stanchion rail are compatible with the material(s) of the overlay system to be applied onto the edge strip and substrate. The term "compatible" as used herein refers to the materials exhibiting similar expansion and contraction properties such that upon exposure to a temperature within a range of from about −20° C. to about 80° C., the materials of the edging system and of the overlay material applied thereto, undergo similar thermal expansion or contraction so that excessive internal stresses do not result which could cause cracking or debonding or other undesirable mechanical or aesthetic defects.

In certain embodiments, the edging systems include optional lighting provisions. The lighting provisions include one or more light emitters which can be affixed or otherwise incorporated in the profiled edge strip. For edge strips having a recessed channel, it may be preferred to incorporate the lighting provisions such as one or more light emitters within the channel. A wide array of light emitters can be used such as but not limited to light emitting diodes (LED's), halogen lights, and incandescent lights for example. Typically, the lighting provisions will be powered via low voltage, i.e. 12 volts or less, direct current systems. In certain applications light distribution elements can be used such as one or more fiber optic cables that transmit and emit light.

To incorporate a lighting device into a channel, affix the lighting device to an upper flat portion of the channel with double-sided tape, adhesive or the like. Depending on the light source and effect desired, the location of the lighting device can be changed accordingly. A self adhering LED light strip can be located on the front or rear surface of the channel to direct light as desired. After installing the light source, install the clear or translucent channel cap by pressing into place. The channel cap is designed to diffuse the light source. The channel cap itself can be colored or textured to modify light transmission and effects as well. The lighting devices can be solid white or any variation of the light spectrum, and can also be capable of changing colors with controls. The main color options are red, blue, green and any combination thereof including white. Pathways for wiring and lighting devices are created by removing material on the inner side of the channel creating a path for wires under the channel cap and substrate.

The present subject matter has wide application and utility. In addition to providing profiled edges on substrates such as countertops; the systems, articles, and methods of the present subject matter can be used in forming contours in nearly any architectural application including exterior ridge lines, building trim, interior walls, fences, and furniture for example.

Other applications for the edge system as a stand-alone system or a substrate for an overlay system include, but are not limited to crown molding, baseboards, shelving, cabinet trim, display cases, tables, picture frames, stair treads, edging on decks, hearths, and the like. The lighting aspect can be incorporated in any of these. For instance, lighting built into the crown molding facing upward will not only provide aesthetics, but will also provide an indirect lighting source for the room or area it is in. In the area of stairs, this would be a source of illumination for pathways in dark areas. For baseboards, the lighting integration can be used to wall wash with a number of colors. Picture frames, tables, and the like can have illumination built right into the edge creating an integral solution and effects that are otherwise not possible. Under cabinet lighting and retrofitting existing countertops with under counter lighting are also contemplated.

Many other benefits will no doubt become apparent from future application and development of this technology.

All patents, patent applications, and articles noted herein are hereby incorporated by reference in their entirety.

As described hereinabove, the present subject matter solves many problems associated with previous strategies, systems and/or devices. However, it will be appreciated that various changes in the details, materials, and arrangements of components, which have been herein described and illustrated in order to explain the nature of the present subject matter, may be made by those skilled in the art without departing from the principle and scope of the claimed subject matter, as expressed in the appended claims.

What is claimed is:

1. An edging system comprising:
    a stanchion rail defining an outer face and an oppositely directed inner face, the stanchion rail adapted for affixment to a substrate such that the inner face of the stanchion rail contacts the substrate;
    a profiled edge strip defining an outer face of the edge strip, and a generally oppositely directed inner face of the edge strip, the inner face of the edge strip defining a receiving channel sized and shaped to fittingly engage the outer face of the stanchion rail, the edge strip also defining a stanchion groove;
    a structural adhesive disposed in the stanchion groove;
    wherein the stanchion rail is engaged within the receiving channel of the profiled edge strip by orienting the edge strip so that the receiving channel defined along the inner face of the edge strip faces the outer face of the stanchion rail and positioning at least one of the edge strip and the stanchion rail toward one another in a direction transverse to the longitudinal axis of the edge strip, and the edge strip is affixed to the stanchion rail by the structural adhesive.

2. The edging system of claim 1 wherein the profiled edge strip further defines an underside extending between the outer face and the inner face of the edge strip, the underside defining a recessed channel, the edge system further comprising:
    a channel cap removably engaged to the profiled edge strip along the underside of the edge strip and extending across the recessed channel.

3. The edging system of claim 2 wherein the edge strip includes inwardly directed retainers extending along opposing walls of the recessed channel and the channel cap includes outwardly projecting ears such that, upon engagement between the channel cap and the edge strip, the ears of the channel cap contact and engage the retainers of the edge strip.

4. The edging system of claim 2 wherein the channel cap is light transmissive.

5. The edging system of claim 1 wherein the edge strip includes a pair of flexible capture projections along the receiving channel, the pair of capture projections spaced apart to define a minimum access dimension of the receiving channel, the stanchion rail defining an outer arcuate surface having a maximum span greater than the minimum access dimension of the receiving channel, whereby upon engagement between the edge strip with the stanchion rail, displacement and flexure occurs between the capture projections.

6. The edging system of claim 1 wherein the profiled edge strip is light transmissive.

7. An edging system comprising:
    a stanchion rail adapted for affixment to a substrate;
    a profiled edge strip defining an outer face, and a generally oppositely directed inner face, the inner face of the edge strip defining a plurality of grooves along the inner face, the profiled edge strip further defining an underside extending between the outer face and the inner face of the edge strip, the underside defining a recessed channel, wherein the plurality of grooves defined along the inner face of the profiled edge strip include at least three parallel grooves spaced apart from one another and extending along at least a portion of the length of the edge strip;
    structural adhesive disposed between the stanchion rail and the edge strip;
    a channel cap removably engaged to the profiled edge strip along the underside of the edge strip and extending across the recessed channel.

8. The edging system of claim 7 wherein the edge strip includes inwardly directed retainers extending along opposing walls of the recessed channel and the channel cap includes outwardly projecting ears such that, upon engagement between the channel cap and the edge strip, the ears of the channel cap contact and engage the retainers of the edge strip.

9. The edging system of claim 7 further comprising at least one layer of an overlay material on at least a portion of the outer face of the profiled edge strip.

* * * * *